United States Patent [19]

Farrand

[11] 4,043,699
[45] Aug. 23, 1977

[54] COUNTERBORE TOOL

[75] Inventor: John M. Farrand, Burnsville, Minn.

[73] Assignee: Design Mold Inc., Lakeville, Minn.

[21] Appl. No.: 694,136

[22] Filed: June 9, 1976

[51] Int. Cl.$^2$ ............................................. B23B 51/00
[52] U.S. Cl. .................................. 408/201; 408/196; 408/197
[58] Field of Search ............... 408/196, 199, 200, 201, 408/239, 239 A, 231, 232, 233, 225

[56] References Cited

U.S. PATENT DOCUMENTS

| 676,669 | 6/1901 | Wack | 408/201 |
|---|---|---|---|
| 967,789 | 8/1910 | Le Baron | 408/201 |
| 1,104,987 | 7/1914 | Grimes | 408/232 |
| 1,336,466 | 4/1920 | lamb | 408/201 |
| 2,359,474 | 10/1944 | Gairing | 408/201 |
| 2,374,761 | 5/1945 | Lusa | 408/201 |
| 3,942,905 | 3/1976 | Gill et al. | 408/239 A |

Primary Examiner—Harrison L. Hinson
Attorney, Agent, or Firm—Frederick E. Lange

[57] ABSTRACT

A counterbore tool having a removable cutting tool in which the cutting tool is disposed in an open slot of the shank, the slot extending inwardly from the outer extremity of the shank and in which the pilot member is secured in telescoping engagement with the end of the shank, the pilot member being detachably held by fastening means which clamps the pilot member against the cutting tool and holds it firmly in place. The cutting tool has a transverse depth equal to the width of the slot so as to fit snugly within the slot. The cutting tool and shank are provided with interfitting male and female members which prevent movement of the cutting tool transverse to the axis of the shank. The pilot member snugly telescopes over the shank and is provided with a slot extending over the outer side edge of the cutting tool. The clamping means for clamping the pilot member onto the shank member and against the cutting tool preferably comprises two screw threaded fastening members disposed on opposite sides of the axial center of the pilot member so that the clamping means also resists any tendency of the pilot member to turn about the axis of the shank. The slot through the pilot member extends for the full width thereof so that it engages the cutting tool for the full width of the pilot member. The interfitting male and female portions of the shank and cutting tool take the form of a stud in projecting outwardly from the base of the slot in the shank and a slot in the cutting tool which fits over and closely engages the stud pin.

The cutting tool preferably has two oppositely disposed portions. The rake and relief angles are preferably so selected that the cutting tool is of a uniform length throughout its width so that the cutting edges of the cutting portion may be sharpened without altering the radius of the counterbore produced by operation of the tool.

7 Claims, 7 Drawing Figures

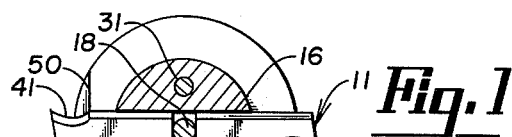
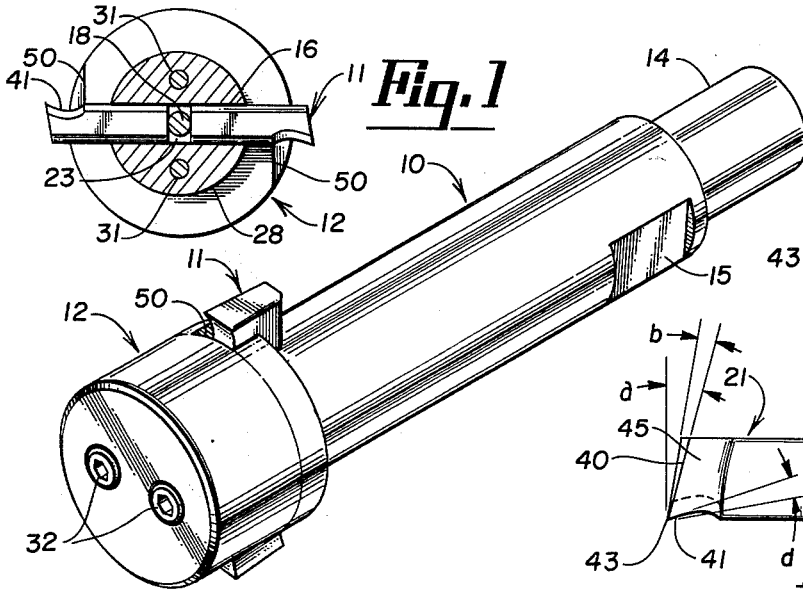
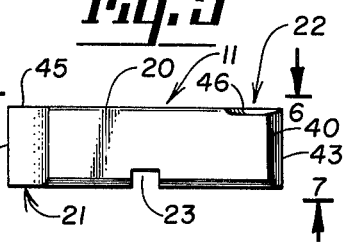
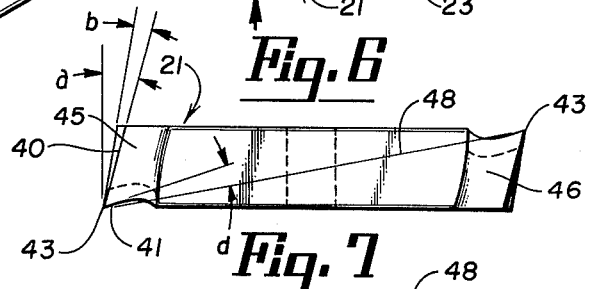
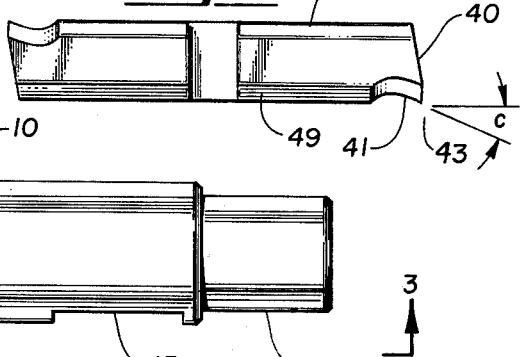
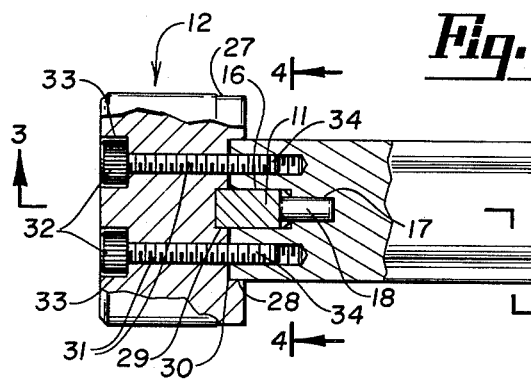
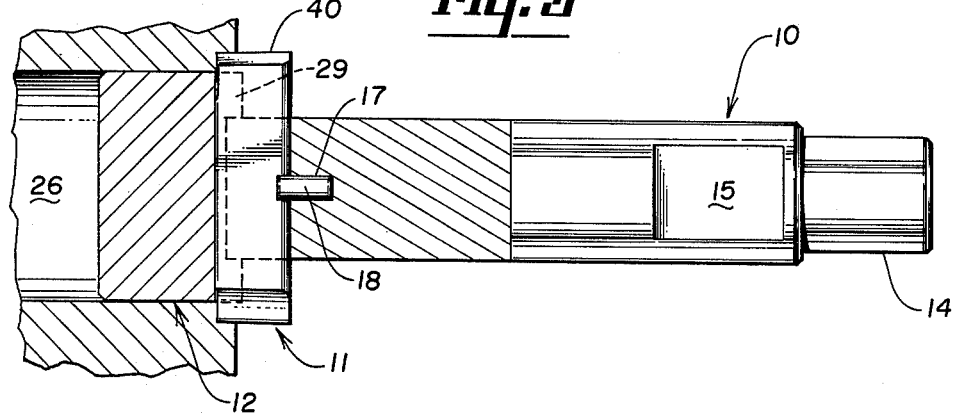

COUNTERBORE TOOL

BACKGROUND OF THE INVENTION

Due to the very high price of tool steel, it is very desirable to have a counterbore tool in which the cutting tool can be replaced. It is also desirable to have one in which the cutting tool can be readily sharpened without changing the radius of the counterbore produced by operation of the tool.

Various arrangements have been developed for having a replacable cutting tool in a counterbore tool. The problem, however, is that it is imperative that the cutting tool be maintained rigidly against any possible movement. It is quite customary with such operations to have a tolerance of not more than 0.001 inches. It is obvious that with this low a tolerance, the cutting tool must be very accurately positioned and maintained against movement relative to the shank and pilot, particularly the latter.

It is also desirable to provide for a cutting tool which has a uniform length between its cutting edges throughout its entire width so that as the cutting tool is periodically sharpened, the length of the cutting tool and hence the size of the counterbore produced by it, will remain the same.

SUMMARY OF THE INVENTION

The present invention is concerned with a counterbore tool with a removable cutting tool in which the cutting tool is accurately and rigidly maintained in position with respect to the pilot and the shank of the tool.

Specifically, this is accomplished by providing a shank with an open ended slot which can be very accurately machined to have a width corresponding to the transverse depth of the cutting tool. A pilot is then provided which has a portion which telescopes over the end of the shank and presses the cutting tool into engagement with the bottom of the slot. Detachable fastening means is provided for holding the pilot in clamping position against the cutting tool.

The cutting tool and shank have interfitting male and female portions to prevent any movement of the tool transversely of the shank. Specifically, this takes the form of a relatively narrow pin which projects from the bottom of the slot in a shank and into a slot in the adjoining side edge of the cutting tool to prevent lateral shifting of the tool.

The fastening means for holding the pilot in clamping position against the cutting tool preferably comprises two screw threaded fastening members disposed on opposite sides of the axial member of the pilot member so that the clamping means also resists any tendency of the pilot member to turn about the axis of the shaft. The pilot member is in telescoping engagement with the shank over only a small portion of the longitudinal depth of the pilot member and has a solid uninterrupted bearing surface extending completely across the pilot member in continuous engagement with the adjacent side edge of the cutting tool. The pilot member also has an open slot of substantially the same width as the transverse depth of the cutting tool and into which the cutting tool extends when the pilot member is clamped in position.

The cutting tool has two oppositely disposed cutting portions and the angles of various surfaces of the cutting tool are so selected that the length of the cutting tool is uniform throughout its width so that the cutting edges of the cutting portion may be sharpened without altering the radius of the counterbore produced by operation of the tool.

Various other objects and features of the invention will be apparent from a consideration of the accompanying specification, claims and drawing.

BRIEF DESCRIPTION OF THE DRAWING

FIG. 1 is a perspective view of the counterbore tool of the present invention;

FIG. 2 is a top plan view of the tool with a portion being shown in section;

FIG. 3 is a side elevational view of the tool being used to produce a counterbore opening, a portion of the tool being shown in section, the section being taken along the line 3—3 of FIG. 2;

FIG. 4 is a sectional view, the section being taken along the line 4—4 of FIG. 2;

FIG. 5 is a side elevational view of the cutting tool of the counterbore tool;

FIG. 6 is a top plan view with, on a somewhat larger scale, the view being taken along the line 6—6 of FIG. 5 and in the direction of the arrows adjacent that line; and FIG. 7 is a bottom plan view of the cutting tool, the view being taken along the line 7—7 of FIG. 5 and in the direction of the arrows adjacent that line.

DESCRIPTION OF THE PREFERRED EMBODIMENT

Referring to FIG. 1, it will be noted that the counterbore tool comprises three main portions, the shank 10, the cutting tool 11, and the pilot member 12. These three members are rigidly held together in a manner which is to be described, but can readily be separated to permit removal of the cutting tool 11.

Referring first to the shank 10, this is in the form of a cylindrical member having one extremity 14 of reduced diameter to enable the shank to be fitted into a chuck of a drill or collet. The shank may also be provided with a flat surface 15 to enable the shank to be inserted into a Weldon holder. The set screw of the Weldon holder is tightened to engage flat 15. At the opposite end of the shank 10, it is provided with a slot 16 best shown in FIG. 2. As will be explained, and is evident from FIG. 2, the slot 16 is designed for reception of the cutting tool 11 and has a width corresponding to the transverse depth of the cutting tool so that the cutting tool 11 snugly fits within the slot 16. The shank 10 is also provided with a bore 17 centrally thereof and a centering pin 18 is located in this bore 17.

Referring to the cutting tool 11, this comprises a body portion 20 and two outer cutting portions 21 and 22 which are identical in shape and configuration except for being oppositely disposed. The cutting tool is also provided with a slot 23. This slot 23 has a width corresponding to the diameter of the pin 18 so that when the cutting tool is in the position shown in FIG. 2, the pin 18 enters the slot 23 and serves to center the tool 11 and prevent any transverse movement thereof with respect to the shank 10.

Referring now to the pilot member 12, the main portion of this pilot member has a diameter corresponding to the diameter of the aperture 26 in which it is desired to produce a counterbore, as best shown in FIG. 3. The pilot 12, in the conventional manner, serves to guide the tool and maintain it accurately with respect to the aperture 26 in which the counterbore is being cut. The pilot 12 has an end portion 27 provided with a cylindrical recess 28 having an interior diameter substantially the same as the exterior diameter of the shank 10. Thus when the pilot 12 is placed over the end of the shank 10, it telescopes slightly with respect thereto and is maintained firmly against any lateral movement with respect to the shank 10. The pilot member 11 is also provided with a transverse slot 29 having a width corresponding to the transverse depth of the cutting tool 11. Thus, when the pilot member 12 is in the position shown in FIGS. 2 and 3, the outer end of the tool 11 extends into the slot 29. The width of tool 11 is such that the tool 11 projects somewhat beyond the slot 16 in the pilot member 10 so as to enter the slot 29 of the pilot member 12. The depth of the recess 28 in the pilot member 12 is sufficiently great that when the pilot member 12 engages the outer side edge of the cutting tool 11, a slight space 30 exists between the inner face of the pilot member 12 and the end of the stem 10. This ensures that the pilot member 12 will firmly engage the end of the cutting member 11.

The pilot member 12 is further provided with a plurality of apertures therethrough, through which extend a plurality of screw threaded fastening members 31 which engage with corresponding threaded openings 34 in the end of the stem member 10. These screws 31 are spaced on opposite sides of the center axis of the stem and of the pilot member 12 so that the screws not only serve, when tightened, to maintain the pilot member 12 in tight engagement with the cutting tool 11 but also guard against any tendency of the pilot member 12 to rotate with respect to the stem 10. The screws 31 are provided with heads 32 which are provided with conventional hex socket openings for the insertion of a hexagonal key wrench. The outer portion of the pilot member 12 is provided with recesses 33 into which the heads 32 fit so that they do not project beyond the outer end of the pilot member 12.

It will be readily understood that when the screws 31 are tightened with the cutting tool 11 in position, the cutting tool is clamped between the pilot member 12 and the stem member 10. Due to the close fit between the slot 29 in the pilot member 12 and the slot 16 in the stem 10 with the cutting portion 20 of the cutting tool 11, the cutting tool 11 is held against any sideways movement transverse to its longitudinal axis. Due to the snug fit between the pin 18 and the walls of the slot 23, the cutting tool is held against any movement transverse to the axis of the stem 10 and the pilot member 12. Due to the clamping action exerted by the pilot member 12 and the stem 10 against the cutting tool 11, movement of the cutting tool 11 longitudinally to the axis of the stem 10 is prevented. Cutting tool 11 is thus not only accurately positioned with regard to the stem and pilot member, but is also held rigidly against any relative movement in any direction with respect thereto. As pointed out previously, this is extremely important since the tolerances required in connection with such a counterbore tool are very critical and any slight movement of the cutting tool in any direction with respect to the pilot and stem members could lead to inaccuracy in connection with the counterbore.

A very important feature of the present invention is that the slots 16 and 29 extend inwardly from the ends of stem member 10 and pilot member 12, respectively. It thus becomes possible to turn these slots on a milling machine in which it is possible to quickly form them and maintain a very close tolerance. In some prior devices, it has been necessary to produce a closed end slot which does not lend itself to production on a milling machine. With such a closed end slot, it is extremely difficult to maintain the tolerances that are required.

A further very important feature is that due to the fact that telescoping portion 27 is relatively short, it is possible for the slot 29 to extend continuously across the pilot member 12 and continuously engage the end of the cutting member 11. This provides for the cutting member being held firmly in position throughout almost its entire length, as is evident from FIG. 3. Due to the tremendous forces exerted on such a cutting tool in operation, it is extremely important that it be held as firm as possible to prevent the slightest movement between the cutting tool and the stem and pilot 12.

One of the advantages of having a removable cutting tool is that it can be periodically sharpened. One of the novel features of my present invention is that the outer edges of the cutting tool are parallel and are spaced apart the same distance their entire width. It is thus possible to periodically sharpen the cutting tool without altering in any way the size of the counterbore produced by it. In order to accomplish this, inasmuch as certain of the surfaces must be inclined to provide relief angles, a rake angle and an inclined shear plane, it is necessary to carefully relate the various angles of inclinations so that the cutting edges remain parallel to each other despite the various inclinations of the different surfaces. Referring first to FIG. 6, it will be noticed that the cutting portion is formed by the intersection of two inclined surfaces 40 and 41 which intersect to provide a cutting edge 43. As will be readily apparent from FIG. 3, only the leading edge of the surface 43 is effective to do the cutting. In other words, as viewed in FIG. 5, it is the upper extremities of the cutting edges 43 that do the cutting. Whenever the tool becomes dull, the tool is ground away along the upper extremities as at 45 and 46 to remove the dull portion of the cutting edge and expose a new sharp portion. In order to provide a relief angle, the edge 40 is inclined at an angle $a$ with respect to the line extending from the cutting edge transverse to the longitudinal axis of the tool. The cutting edge is not inclined throughout its full width at this angle with respect to the vertical line. The relief angle gets progressively less proceeding from the top of the tool as viewed in FIG. 5 to the bottom. The difference in inclination of the cutting edge from the top of the tool to the bottom is indicated by the angle $b$. The surface 41 is inclined with respect to the longitudinal axis of the cutting tool to provide a rake angle which is indicated in FIG. 7 as angle $c$. While the cutting surface 41 is also inclined from top to bottom as indicated in FIG. 7 to provide further relief for the cutting edge, the angle $c$ that it makes with respect to the longitudinal axis of the cutting tool is constant throughout the width of the cutting tool. In determining this rake angle, we have found it desirable to maintain a constant rake angle with respect to a diagonal line 48 extending between the opposite cutting edges 43. This angle is indicated in FIG. 6 as angle $d$. We have found that an angle of 10° between surface 41 and line 48 is desirable. With proper coordination of angles $b$ and $d$, and the slope of surface 41 from one side edge to the opposite side edge of the tool, it is possible to arrange the cutting edges 43 so that these are parallel with each other despite the fact that both surfaces 40 and 41 are inclined in two different planes. Thus, the desired relief angles and the desired rake angle are obtained without affecting the parallel relationship between the cutting edges 43.

In operation, the cutting edges 43 at their upper edges as viewed in FIG. 5 proceed to cut material from the material being worked upon causing a chip to move along the surface 41 curving outwardly at its inner extremity. As shown in FIG. 4 and partially in FIG. 5, the pilot member 12 is provided with two flats 50 which provide chip recesses which communicate with the inner ends of the curved surfaces 41. The chip that is thus cut is guided along the curved surface and along the flats 50 outwardly where it eventually leaves the tool.

It will be seen that I have provided a counterbore tool in which the cutting tool, even though removable, is held firmly against any movement relative to the pilot and the stem. Furthermore, it can readily be removed and sharpened many times without in any way affecting the diameter of the counterbore being drilled. It will be further seen that by reason of the construction employed, the counterbore tool can be produced very inexpensively with conventional machinery tools.

While I have shown a specific form of my invention, it is to be understood that this is for illustration only and that the scope of the invention is limited solely by that of the appended claims.

I claim:

1. A counterbore tool comprising:
   a shank to be mounted in a machine tool for rotation thereof, said shank having an open slot of uniform depth extending inwardly from the outer extremity of said shank,
   a cutting tool having a body portion and an outer cutting portion, said body portion being disposed in said slot in engagement with the bottom of said slot completely across said shank portion, said body portion having a depth substantially equal to the width of the slot so as to prevent any relative lateral movement of said tool with respect to said shank and having a width greater than the depth of said slot so as to project beyond the open end of the slot,
   said cutting tool and said shank having interfitting male and female portions to prevent any movement of said tool longitudinally thereof and transversely of said shank,
   a pilot member disposed in telescoping engagement with and over the end of said shank in which said cutting tool is disposed and engaging said cutting tool and having a diameter greater than that of the shank but less than the length of said cutting tool, said pilot member having an open slot of substantially the same width as the depth of said cutting tool and into which said cutting tool extends,
   and clamping means for holding said pilot member on said shank member and clamping said cutting tool therebetween in the open slots of said shank and said pilot member to prevent any movement of said cutting tool longitudinally of said shank, said cutting portion of said cutting tool extending radially a predetermined distance beyond the outer wall of said pilot member.

2. The counterbore tool of claim 1 in which said clamping means comprises two screw threaded fastening members disposed on opposite sides of the axial center of said pilot member so that said clamping means also resists any tendency of said pilot member to turn about the axis of said shank.

3. The counterbore tool of claim 1 in which said pilot member is in engagement with said cutting tool for the full width of said pilot member.

4. The counterbore tool of claim 1 in which said pilot member extends over the end of said shank in telescopic engagement therewith over only a small portion of the longitudinal depth of the pilot member and has a solid uninterrupted bearing surface extending completely across said pilot member in continuous engagement with the adjacent edge of the cutting tool.

5. The counterbore tool of claim 1 in which the male portion of said interfitting portions is a central stud projecting from the base of said open slot and the female portion is a transverse slot in the adjacent edge of the cutting tool.

6. The counterbore tool of claim 1 in which the cutting tool has two oppositely disposed cutting portions.

7. The counterbore tool of claim 6 in which the length of the cutting tool is uniform throughout its width so that the cutting edges of the cutting portion may be sharpened without altering the radius of the counterbore produced by operation of the tool.

* * * * *